United States Patent
Kongable et al.

(10) Patent No.: US 6,765,220 B2
(45) Date of Patent: Jul. 20, 2004

(54) INFRARED SCENE GENERATOR USING FLUORESCENT CONVERSION MATERIAL

(75) Inventors: Albert W. Kongable, Orlando, FL (US); Mark T. Myers, Orlando, FL (US)

(73) Assignee: Lockheed Martin Corporation, Bethesda, MD (US)

( * ) Notice: Subject to any disclaimer, the term of this patent is extended or adjusted under 35 U.S.C. 154(b) by 341 days.

(21) Appl. No.: 09/756,660

(22) Filed: Jan. 10, 2001

(65) Prior Publication Data

US 2003/0213923 A1 Nov. 20, 2003

(51) Int. Cl.[7] .............................................. G01J 1/00
(52) U.S. Cl. .............................. 250/495.1; 250/504 R
(58) Field of Search ......................... 250/494.1, 495.1, 250/504 R

(56) References Cited

U.S. PATENT DOCUMENTS

| | | | |
|---|---|---|---|
| 3,818,129 A | * 6/1974 | Yamamoto | 348/754 |
| 4,047,033 A | * 9/1977 | Malmberg et al. | 250/341.1 |
| 4,302,678 A | 11/1981 | Schiffert | |
| 4,451,530 A | * 5/1984 | Kaule et al. | 428/323 |
| 4,452,843 A | * 6/1984 | Kaule et al. | 428/199 |
| 5,175,432 A | 12/1992 | Reitman et al. | |
| 5,185,526 A | 2/1993 | Reitman et al. | |
| 5,576,553 A | 11/1996 | Adachi | |
| 5,581,089 A | 12/1996 | Kohno | |
| 5,596,185 A | 1/1997 | Bross et al. | |
| 5,710,431 A | 1/1998 | Spindler | |
| 5,838,435 A | 11/1998 | Sandison | |
| 6,128,131 A | * 10/2000 | Tang | 359/443 |
| 6,359,745 B1 | * 3/2002 | Thomas et al. | 360/69 |
| 6,510,001 B1 | * 1/2003 | Engelhardt et al. | 359/385 |

OTHER PUBLICATIONS

U.S. patent application No. 09/756,659, filed Jan. 10, 2001, entitled "*Method And Apparatus For Boresighting a Laser With a Forward Looking Infrared Device*" by Albert W. Kongable.

L.B. Shaw et al., "Radiative and Multiphonon Relaxation of the Mid–IR Transitions of $Pr^{3+}$ in $LaCl_3$ ", *IEEE Journal of Quantum Electronics*, vol. 32, No. 12, Dec. 1996, pp. 2166–2172.

M. C. Nostrand et al., "Spectroscopic data for infrared transitions in $CaGa_2S_4Dy^{3+}$ , Na", AMF4, pp. 167–169.

L.F. Johnson et al., "Laser emission at 3 $\mu$ from $Dy^{3+}$ in $BaY_2F_8$", *Applied Physics Letters*, vol. 23, No. 2, Jul. 15, 1973, pp. 96–98.

* cited by examiner

*Primary Examiner*—Bruce Anderson
(74) *Attorney, Agent, or Firm*—Burns, Doane, Swecker & Mathis, L.L.P.

(57) ABSTRACT

A compact infrared (IR) scene generator capable of generating multiple-color mid-IR scenes through the use of readily available commercial near-IR lasers and a fluorescent conversion material (FCM). Such a scene generator would be useful to test IR imaging sensors in a controlled laboratory environment. In operation, each laser emits energy at an initial wavelength outside the operating band of an IR imaging sensor. This energy of a first set of wavelengths is written onto the FCM in patterns, which collectively form an IR scene. The FCM absorbs the energy and radiates it at wavelengths longer than the initial wavelengths, i.e., a second set of wavelengths. As these longer wavelengths are within the operating waveband of the IR imaging sensor, the patterns written onto the FCM are detectable by it.

25 Claims, 3 Drawing Sheets

INFRARED SCENE GENERATOR USING FLUORESCENT CONVERSION MATERIAL

BACKGROUND OF THE INVENTION

1. Field of the Invention

The present invention generally relates to the testing of sensor systems and, in particular, to a system of generating an infrared scene using a fluorescent conversion material (FCM).

2. Background Information

The use of infrared (IR) imaging sensors, both mid-wave infrared (MWIR) operating approximately in the 3–5 $\mu$m waveband and long-wave infrared (LWIR) operating approximately in the 7–12 $\mu$m waveband, have become common in both the commercial and military applications. In military and security systems, for example, IR imaging sensors have often been used to monitor and visually describe spatial areas to determine the presence or movement of objects within the area.

A sensor system accomplishes this by detecting the various temperatures in an area and then by generating an image showing the distribution of temperatures. Such an image or "scene" is used to determine, among other information, the shapes of objects in the area and their proximity to the sensor system. An example of a sensor system used for scene generation is described in U.S. Pat. No. 5,710,431, the disclosure of which is hereby incorporated by reference in its entirety. In a military setting, for example, objects detected may be enemy troops or vehicles; therefore, it is essential that the IR imaging sensors be precisely calibrated, sighted, and in otherwise perfect working order.

To accurately and completely characterize the performance of a system utilizing such sensors, it is advantageous to be able to generate synthetic infrared scenes in a controlled laboratory environment. The most widely used IR scene generator produces images with an array of resistive heaters, also known as a microbolometer. However, this type of device has numerous shortcomings.

First, a microbolometer takes time to both heat up and cool off, approximately 15 milliseconds for each transition. Second, with resistive heaters, long periods of time spent simulating a bright source will cause adjacent areas of the array to heat up, causing the scene in these areas to be wiped out. And third, the microbolometer must have a very large number of small resistors to achieve high resolution. Any failure of one of these heating elements will reduce the quality and capability of the scene generator.

What is needed is a system for testing IR imaging sensors by generating laboratory-controlled IR scenes in a way that is fast, accurate, and relatively inexpensive to manufacture.

SUMMARY OF THE INVENTION

The present invention is directed to a system using a fluorescent conversion material for generating detailed, dynamic IR scenes that can be used in testing IR imaging sensors.

According to a first embodiment of the present invention, an infrared scene generator is provided, comprising a plurality of sources emitting energy at a first set of wavelengths, a fluorescent conversion material, a plurality of beam steering optics directing the emitted energy onto the fluorescent conversion material, wherein the first set of wavelengths are absorbed and radiated by the fluorescent conversion material as a second set of wavelengths, and an infrared imaging sensor detecting energy of the second set of wavelengths.

According to a second embodiment of the present invention, a system is provided for generating an infrared scene, comprising first emitting means for emitting energy of a first wavelength, converting means for converting the energy of a first wavelength to energy of a second wavelength using fluorescent conversion, and sensing means for detecting energy of the second wavelength.

According to a third embodiment of the present invention, a method is provided for generating an infrared scene, comprising the steps of emitting energy of a first wavelength, converting the energy of a first wavelength into energy of a second wavelength using a fluorescent conversion material, and detecting energy of the second wavelength.

BRIEF DESCRIPTION OF THE DRAWINGS

Other objects and advantages of the present invention will become more apparent from the following detailed description of preferred embodiments, when read in conjunction with the accompanying drawings wherein like elements have been represented by like reference numerals and wherein.

DETAILED DESCRIPTION OF THE INVENTION

Exemplary embodiments of the present invention use a class of materials referred to as fluorescent conversion materials (FCM's). An example of a system using a fluorescent conversion material is described in U.S. Pat. No. 4,302,678, the disclosure of which is hereby incorporated by reference. FCM's possess the ability to absorb laser radiation of one wavelength and then, through a process of non-radiative and radiative transitions, emit one or more photons at a longer wavelength. This method offers at least three advantages over the microbolometer approach.

First, a system using fluorescent conversion allows much faster changes to be made to an IR image and produces radiation almost immediately, without the need to heat-up or cool-down waiting periods associated with a microbolometer. In addition, when a stimulating energy (i.e., radiation) directed onto a fluorescent material is stopped, the material will continue to fluoresce (i.e., radiate the absorbed energy at a second wavelength) for anywhere from 100 microseconds to 20 milliseconds depending on the specific material properties selected. This faster response time will permit the displaying of more dynamic scenes and the testing of higher frame rate sensors. Second, the simulated scene will not bloom during the generation of bright objects. In other words, unlike with a microbolometer, the areas where a stimulating radiation is incident on a fluorescent material will not increase in size and "blur out" adjacent areas when the material radiates. Third, the monolithic nature of the fluorescent conversion material will not result in single point failures, unlike a microbolometer, which depends on each and every resistor to achieve high resolutions. Because of this, the use of a fluorescent conversion material will lead to higher yields and require lower fabrication costs.

Figure 4A:
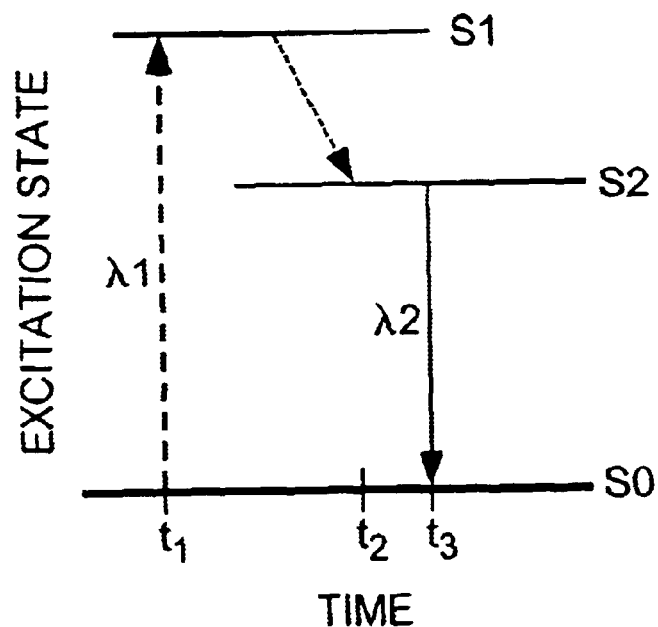
FIGS. 4a and 4b illustrate the process of fluorescence.

The quantum or photonic process known as fluorescent conversion is shown in FIG. 4a, whereby at time $t_1$ an ion or a molecule in the ground state $S_0$ absorbs an incident photon that falls within the characteristic absorption bands of that particular ion or molecule, and is elevated to an excited state $S_1$. At time $t_2$, the excited ion/molecule relaxes, through vibrational or rotational interactions to a lower (less energy) excited state $S_2$ and then finally relaxes back to the ground (unexcited) state at $t_3$ through the emission of a photon of longer wavelength $\lambda 2$ than the wavelength of the exciting photon $\lambda 1$. In this way, a material that possesses the ability to perform fluorescent conversion can, for example, be optically "pumped" in near-IR region (~0.7 to 3.0 μm) and then fluoresce in mid-IR region (~3.0 to 5.0 μm).

Figure 4B:
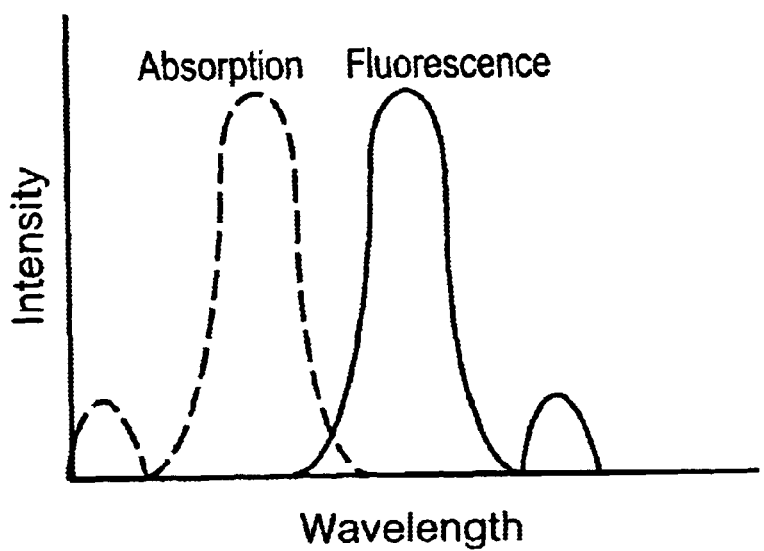

FIG. 4b illustrates the relationship between energy intensity and wavelength. Energy (i.e., a photon) of a shorter wavelength, as seen in FIG. 4b, is absorbed by an ion or a molecule but may not be "seen" by a passive sensor of a particular operating band (shown by the dotted line). Once the photon is emitted (as at $t_3$ in FIG. 4a), the wavelength is increased and the energy may be detected by the sensor.

Figure 1:
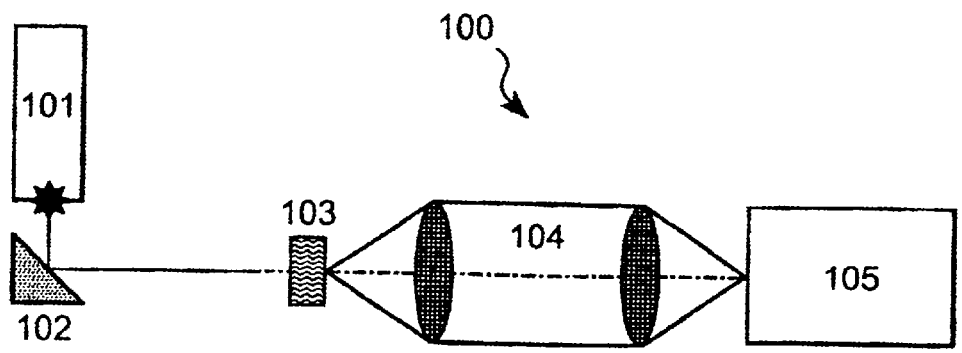
FIG. 1 illustrates a monochromatic scene generator in accordance with one embodiment of the present invention.
Figure 2:
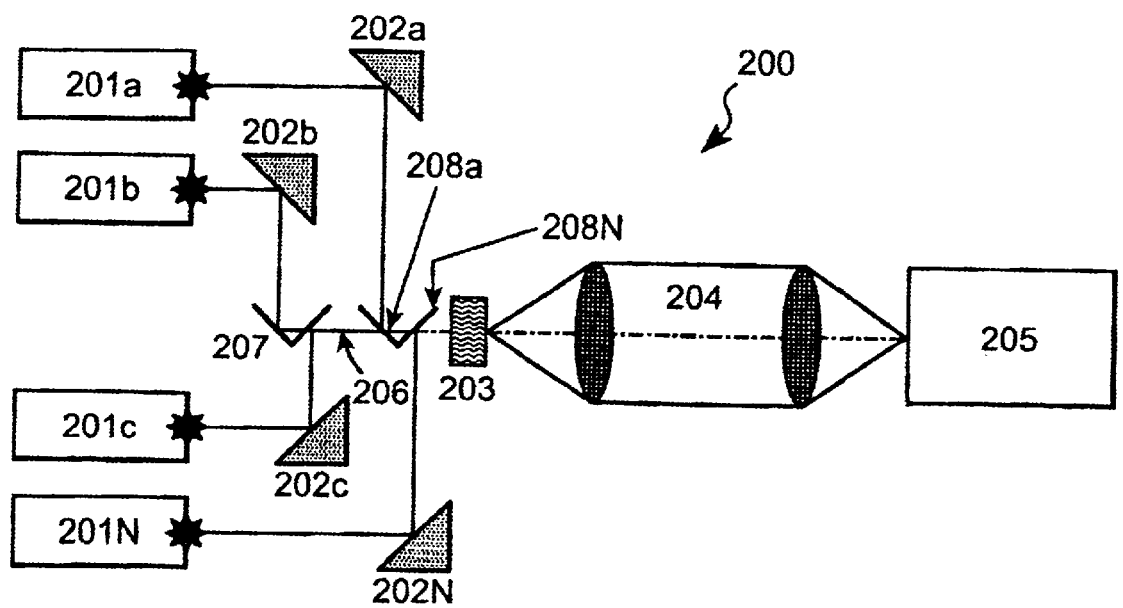
FIG. 2 illustrates a polychromatic scene generator in accordance with another embodiment of the present invention.

Two exemplary embodiments of an IR scene generator according to the present invention are shown in FIGS. 1 and 2. Both the monochromatic scene generator 100 of FIG. 1 and the polychromatic scene generator 200 of FIG. 2 comprise four primary modules.

The first module comprises one or more first emitting means for emitting energy at either a first wavelength or a first set of wavelengths. These energy input means or sources are represented as a single laser 101 in FIG. 1 and as a plurality of lasers 201a–N in FIG. 2. If the IR scene to be generated can be monochromatic (only one IR color) then only one input laser 101 would be required. If a polychromatic (multicolor) IR image is desired, then multiple input lasers 201a–N can be used to address multiple absorption/emission bands in the fluorescent conversion material 203. In the case of FIG. 1, laser 101 provides an input energy with an wavelength $\lambda 1$ that the FCM 103 would then convert up to a energy with a longer wavelength $\lambda 2$ that is within the sensitive waveband of the IR imaging sensor 105.

FIG. 2 illustrates a polychromatic scene generator 200 generating an N color IR image and using N input lasers 201a–N. N can be any arbitrary number greater than 1, but in exemplary embodiments can be practically limited by the number of emission bands present in the FCM 203. In addition, the intensity of the generated scene features can be modulated by modulating the intensity of the input laser 101 or lasers 201a–N. These energy sources do not have to be lasers, but the use of commercial diode lasers or commercial solid state lasers (such as Nd:YAG, operating in the visible- to near-IR wavelength regions, 0.7 to 3.0 μm) would be an easy and effective solution.

The second module is the beam steering optics, represented as single beam steering optic 102 in FIG. 1 and a plurality of beam steering optics 202a–N in FIG. 2. The beam steering optic 102 or beam steering optics 202a–N act to direct emitted energy onto a fluorescent conversion material (e.g., FCM 103 or 203) and can be any type of 2-axis computer controlled beam steering devices, such as fast steering or scanning mirrors, prisms, Acousto-Optic modulators, or Electro-Optic modulators. The use of these devices for "writing" patterns with lasers is very well developed, being used extensively in both commercial entertainment (laser light shows) and the semiconductor industry (writing complex patterns for lithographic exposures). For monochromatic scene generators, only one beam steering optic 102 is required, and no beam combining optics (elements 208a–N in FIG. 2) are needed. For a polychromatic scene generator, a separate beam steering optic (202a, b, c, or N) may be required for each input laser (201a, b, c, or N, respectively), so that each laser energy can be "written" onto the FCM in a different pattern. The beam combining optics 208a–N may be dichroic beam combiners that reflect the wavelength being inserted into the common path 206 and transmit all of the other wavelengths in the path 206. For example, beam combiner 208N reflects the wavelength of laser 201N and transmits the wavelengths of lasers 201a–c.

The third module is a converting means using fluorescent conversion, represented by FCM 103 and 203 in FIGS. 1 and 2, respectively. The FCM 103 or 203 can be a plate of arbitrary cross sectional shape that allows the imaging sensor 105 or 205 to "see" the incident laser energy by converting the laser wavelength(s) to a wavelength(s) that falls within the sensitivity waveband of the imaging sensor 105 or 205. During the generation of a polychromatic IR image, for example, energy from lasers 201a–N are focused onto the FCM 203 and scanned (or "written") onto the surface in the pattern desired, absorbed by the FCM 203, and then at the areas where the laser energys are incident, the FCM 203 will radiate them at wavelengths that are detectable by the IR imaging sensor 205.

The FCM 103 or 203 can be fabricated as a thin flat plate with two major surfaces. A first surface of the plate, which is nearest to laser 101 or lasers 201a–N, can be anti-reflection (AR) coated for the laser wavelength(s) and rejection coated for the waveband of the passive imaging sensor 105 or 205. The back surface of the plate, nearest to the IR imaging sensor 105 or 205, can be AR coated for the waveband of the passive imaging sensor 105 or 205, but can be coated with a blocking filter for the laser wavelength(s) to provide protection to the IR detector array (comprised in IR imaging sensor 105 of 205) against direct illumination by the laser 101 or lasers 201a–N.

Figure 3:
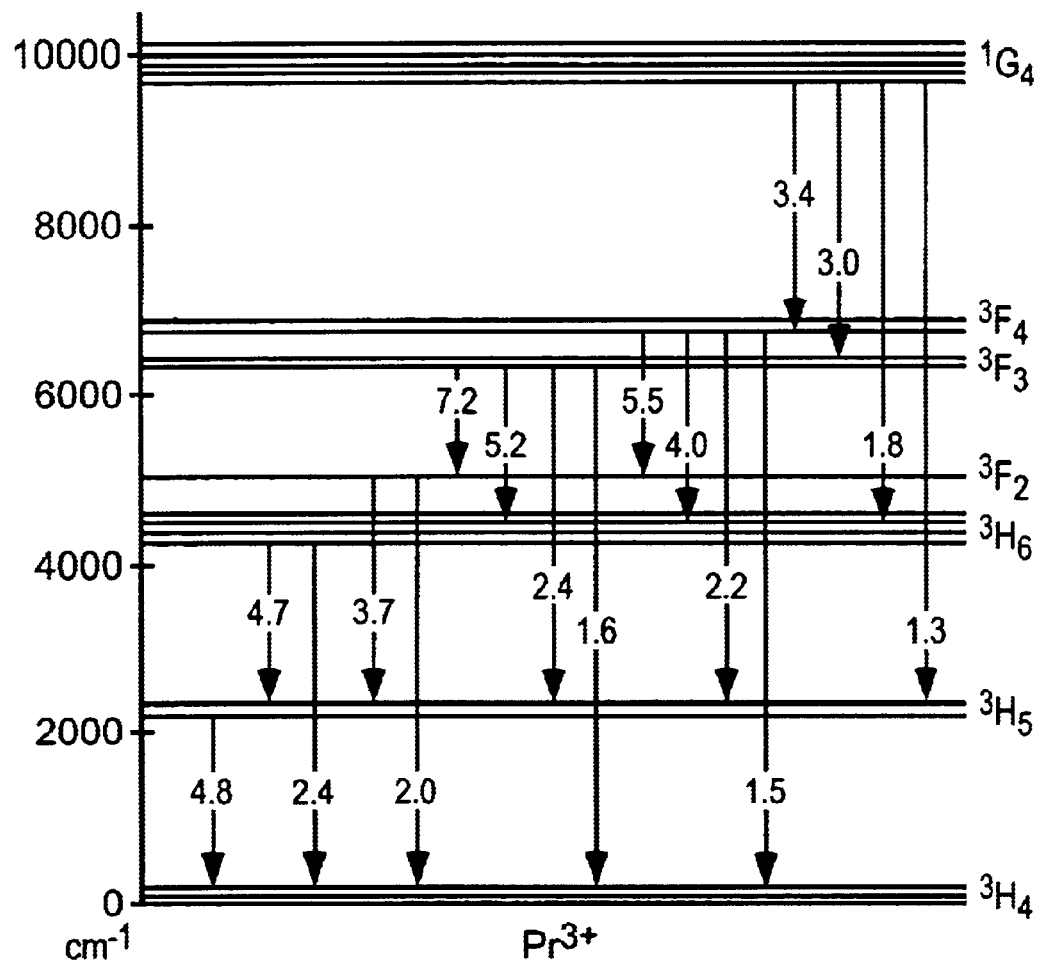
FIG. 3 is an exemplary diagram illustrating possible radiative transitions resulting from the use of Praseodymium doped into LaCl3 as a fluorescent conversion material.

One candidate for use as the FCM 103 or 203 in a mid-wave IR (MWIR) scene generator is the trivalent rare earth ion Praseodymium $(Pr^{3+})$[1] doped into various hosts. FIG. 3 shows the radiative transitions that can occur between the lower level manifolds of $Pr^{3+}$ when doped into LaCl3 as the host material. The numbers in each downward pointed arrow represent the nominal wavelength (in micrometers) of the energy emitted when the material relaxes from a higher level to a lower level as indicated by the ends of the arrow. For instance, exciting the ion from the $^3H_4$ (ground) level to the $^3H_6$ level and then having it relax back down to the $^3H_5$ level would produce fluorescence at around 4.7 μm. Further radiative transitions from the $^3H_5$ back to the $^3H_4$ levels would again emit at around 4.8 μm.

Table I gives a summary of how this material can be used to generate a polychromatic MWIR scene generator. By pumping the FCM 203 with multiple lasers 201a–N, different spectral components in the image can be generated at specific locations, and the relative intensities of the spectral components can be adjusted by varying the intensity of the input laser.

TABLE 1

Potential Input and Output Wavelength from $Pr^{3+}$:$LaCl_3$

| Pump (absorption) transition | Pump wavelength (µm)/ potential input laser type | Fluorescent wavelength (µm) |
|---|---|---|
| $^3H_4 \rightarrow {}^1G_4$ | 1.01–1.06/Nd: YAG, Nd: Glass | 4.7–4.8 |
| $^3H_4 \rightarrow {}^3F_2$ | 2.0–2.1/Tm: YAG | 3.7, 3.7–4.8 |
| $^3H_4 \rightarrow {}^3F_3$ | 1.55–1.58/Nd: YAG OPO, diodes | 5.2 |

The fourth module is a sensing means for detecting energy of a second wavelength or of a set of second wavelengths, that is, energy radiated by FCM 103 or 203. The sensing means is represented by IR imaging sensor 105 in FIG. 1 and IR imaging sensor 205 in FIG. 2.

In this way, the present invention provides a simple and effect method of generating a multiple-color IR scene, such as would be seen in an operational setting where multiple objects of different temperatures are in a single image, or when an object with a temperature distribution across its projected surface is present in the scene.

It will be appreciated by those skilled in the art that the present invention can be embodied in other specific forms without departing from the spirit or essential characteristics thereof. The presently disclosed embodiments are therefore considered in all respects illustrative and not restricted. The scope of the invention is indicated by the appended claims rather than the foregoing description and all changes that come within the meaning and range and equivalence thereof are intended to be embraced within.

What is claimed is:

1. An infrared scene generator comprising:
    a plurality of sources emitting energy at a first set of wavelengths;
    a fluorescent conversion material;
    a plurality of beam steering optics directing the emitted energy onto the fluorescent conversion material, wherein the first set of wavelengths are absorbed and radiated by the fluorescent conversion material as a second set of wavelengths; and
    an infrared imaging sensor detecting energy of the second set of wavelengths, wherein the beam steering optics write dynamic patterns onto the fluorescent conversion material with the first set of wavelengths and the written dynamic patterns are radiated by the fluorescent conversion material as the second set of wavelengths.

2. The infrared scene generator of claim 1, wherein the written dynamic patterns constitute an infrared scene.

3. The infrared scene generator of claim 1, wherein the infrared imaging sensor is adjusted based on the detected second set of wavelengths.

4. The infrared scene generator of claim 1, wherein the fluorescent conversion material has a first surface which receives the first set of wavelengths, and a second surface which radiates the second set of wavelengths.

5. The infrared scene generator of claim 4, further wherein:
    the first surface is anti-reflection coated for the first set of wavelengths and rejection coated for an operating waveband of the infrared imaging sensor; and
    the second surface is anti-reflection coated for an operating waveband of the infrared imaging sensor and rejection coated for the first set of wavelengths.

6. The infrared scene generator of claim 1, wherein each beam steering optic is associated with a single source.

7. The infrared scene generator of claim 6, wherein each beam steering optic is a two-axis computer controlled beam steering device.

8. The infrared scene generator of claim 7, wherein each beam steering optic is a fast steering mirror, prism, acousto-optic modulator, or electro-optic modulator.

9. The infrared scene generator of claim 1, further comprising a plurality of beam combining optics, wherein the beam combining optics direct the first set of wavelengths into a common path.

10. The infrared scene generator of claims 1, wherein the first set of wavelengths are outside an operating waveband of the infrared imaging sensor and the second set of wavelengths are within an operating waveband of the infrared imaging sensor.

11. The infrared scene generator of claim 1, wherein each source is a laser.

12. The infrared scene generator of claim 1, wherein the fluorescent conversion material is a host material doped with a trivalent rare earth ion.

13. The infrared scene generator of claim 12, wherein the trivalent rare earth ion is Praseodymium.

14. A system for generating an infrared scene, comprising:
    first emitting means for emitting energy of a first wavelength;
    converting means for converting the energy of the first wavelength to energy of a second wavelength using fluorescent conversion, wherein the second wavelength is longer than the first wavelength;
    sensing means for detecting energy of the second wavelength; and
    steering means for directing the energy of the first wavelength onto the converting means,
    wherein the steering means writes a pattern onto the converting means with the energy of the first wavelength.

15. The system of claim 14, wherein the sensing means detect the energy of the second wavelength in the written pattern.

16. A system for generating an infrared scene, comprising:
    first emitting means for emitting energy of a first wavelength;
    converting means for converting the energy of the first wavelength to energy of a second wavelength using fluorescent conversion;
    sensing means for detecting energy of the second wavelength; and
    second means for emitting energy of a third wavelength, wherein the second wavelength is longer than the first wavelength and
    wherein means for converting converts the energy of the third wavelength to energy of a fourth wavelength.

17. The system of claim 14, further comprising steering means for directing the energy of the first wavelength and the energy of the third energy onto the converting means.

18. The system of claim 17, wherein the steering means writes patterns onto the converting means with the energy of the first wavelength and the energy of the third wavelength.

19. The system of claim 18, wherein the sensing means detect the energy of the second wavelength and the energy of the fourth wavelength in the written patterns.

20. A method of generating an infrared scene, comprising the steps of:

emitting energy of a first wavelength;

converting the energy of the first wavelength into energy of a second wavelength using a fluorescent conversion material;

detecting the energy of the second wavelength; and directing the energy of the first wavelength onto the fluorescent conversion material, wherein the step of directing further comprises writing a dynamic pattern onto the fluorescent conversion material with the energy of the first wavelength.

21. The method of claim 20, wherein the step of detecting further comprises the detecting of the energy of the second wavelength in the written dynamic pattern.

22. The method of claim 20, further comprising the step of emitting energy of a third wavelength and the step of converting the energy of the third wavelength to energy of a fourth wavelength.

23. The method of claim 22, further comprising the step of directing the energy of the third wavelength onto the fluorescent conversion material.

24. The method of claim 23, wherein the step of directing further comprises the step of writing patterns onto the converting means with the energy of the third wavelength.

25. The method of claim 24, wherein the step of detecting further comprises the detecting of the energy of the fourth wavelength in the written dynamic patterns.

* * * * *

UNITED STATES PATENT AND TRADEMARK OFFICE
CERTIFICATE OF CORRECTION

PATENT NO. : 6,765,220 B2
DATED : July 20, 2004
INVENTOR(S) : Albert W. Kongable et al.

It is certified that error appears in the above-identified patent and that said Letters Patent is hereby corrected as shown below:

Column 6,
Line 59, delete "third energy" and insert therefor -- third wavelength --.

Signed and Sealed this

First Day of February, 2005

JON W. DUDAS
*Director of the United States Patent and Trademark Office*